Nov. 10, 1931. E. J. McCUNE 1,831,312
BRAKE LINING MEANS
Filed Aug. 19, 1929 2 Sheets-Sheet 1

INVENTOR.
Edward J. McCune.
BY Homer G. Sweet.
ATTORNEY.

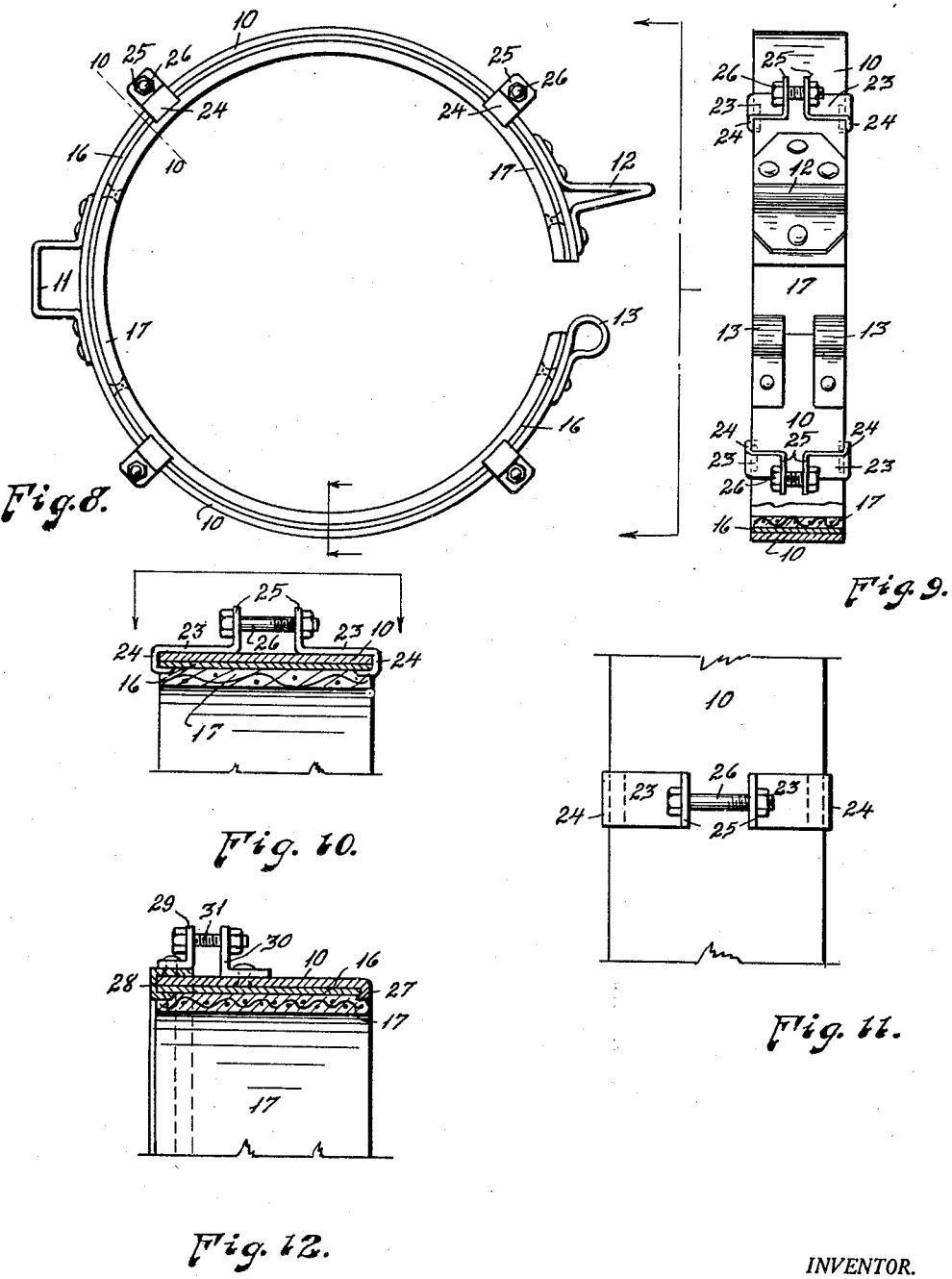

Patented Nov. 10, 1931

1,831,312

UNITED STATES PATENT OFFICE

EDWARD J. McCUNE, OF ARVADA, COLORADO

BRAKE LINING MEANS

Application filed August 19, 1929. Serial No. 386,743.

An object of this invention is to provide an improved removable and replacable brake lining.

A further object of the invention is to provide improved means for supporting a brake lining in operative position.

A further object of the invention is to provide an improved combination of brake lining and brake lining supporting means whereby removal and replacement of said lining is facilitated.

A further object of the invention is to provide improved means for removably and replacably positioning a brake lining relative to a brake operating band.

A further object of the invention is to provide an improved construction of brake lining including a metallic backing strip fixed to said lining whereby the removal and replacement of said lining relative to its supporting means is facilitated.

A further object of the invention is to provide an improved brake lining particularly adapted for use on motor vehicles whereby the brake lining of a motor vehicle may be renewed with ease and at small expense.

My invention consists in the construction, arrangement and combination of elements hereinafter set forth, pointed out in my claims and illustrated by the accompanying drawings, in which—

Figure 1:
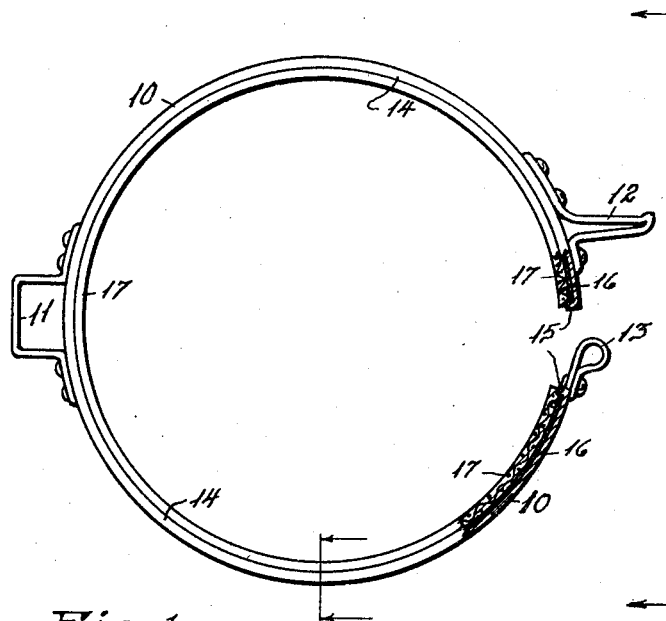
Figure 2:
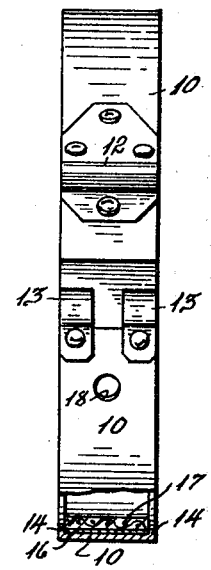
Figure 3:
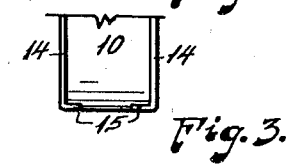
Figure 4:
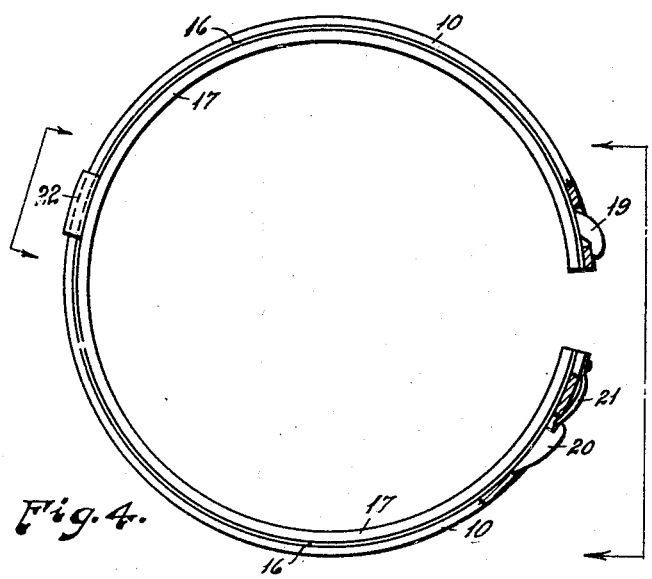
Figure 5:
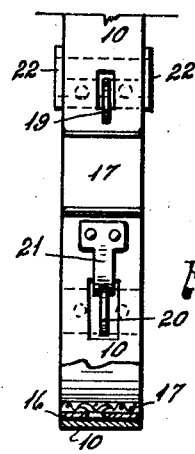
Figures 6, 7:
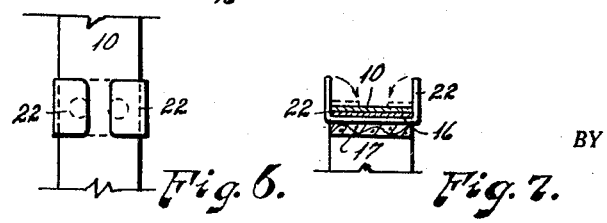

Figure 1 is a side elevation, partly in section, of the preferred form of the invention. Figure 2 is an elevation, partly in section, of and at right angles to the showing of Figure 1. Figure 3 is a fragmentary, detail view of one end of the lining supporting means according to the showing of Figures 1 and 2. Figure 4 is an elevation, partly in section, of a modified form of the invention. Figure 5 is an elevation, partly in section, of the improved brake lining employed in the showing of Figure 4 and removed from its supporting band. Figure 6 is a fragmentary, detail view of one of the attaching clips employed in the modification according to Figure 4. Figure 7 is a fragmentary cross section of the showing of Figure 6. Figure 8 is a side elevation of a further modification of the invention as adapted for use with supporting bands of common type. Figure 9 is an elevation, partly in section, of and at right angles to the showing of Figure 8. Figure 10 is a cross section, on an enlarged scale, on the indicated line 10—10 of Figure 8. Figure 11 is a fragmentary, detail plan of the showing of Figure 10. Figure 12 is a cross section of a further modification of the invention.

This invention relates to friction brakes of a type wherein a friction lining is supported by a flexible band expansible or contractable to bring said lining into engagement with a rotating drum to retard or limit the speed of rotation of said drum, and the invention is illustrated in the drawings as applied to the external or contractable brake commonly to be found on motor vehicles, though it is to be understood that the invention is equally applicable to the internal or expansible brakes of motor vehicles and to brake mechanisms other than those of motor vehicles.

In the construction of the preferred form of the invention as illustrated in Figures 1, 2 and 3 of the drawings, a brake band 10 is formed of flexible metal in the shape of an interrupted circle and is provided with a yoke 11 fixed to said band substantially opposite the interrupted portion of the circle whereby said band may be fixed to a suitable support adjacent and in encircling relation with a rotatable drum in a common and well known manner, suitable means, such as an arm 12 and loop 13, being fixed to the band 10 adjacent the free ends thereof for engagement with brake actuating means whereby the band 10 may be contracted into engaging relation with the surface of said drum, as is common practice in the art. In the preferred form of the invention the band 10 is formed with inwardly-extending, circumferential flanges 14 on each side margin, said flanges defining a shallow channel on the inner surface of said band, said flanges being continued across the free ends of the band 10 to form spaced stop lugs 15 transversely of and projecting inwardly from each of said band ends substantially at right angles with the flanges 14. A normally straight strip of spring metstrip 16 having a width and thickness adapted to fit snugly within and substantially fill the channel of the band 10 formed by the flanges 14, is cut to a length equal to the circumferential length of said channel between the lugs 15 and a length of friction brake lining material 17 of a suitable width is rigidly secured to one side of said strip 16 in any desired manner, rivets passing through holes in said strip and having expanded ends engaging in the lining material being a common and satisfactory fastening means. The combined strip 16 and lining 17 is adapted to be manually bent against the normal tension of said strip into the form of a circle with said lining innermost and slipped into the channel of the band 10 between the flanges 14 and lugs 15, the tension of the strip 16 causing said strip to seat closely within and conform to the contour of said channel and the end lugs 15 engaging against the ends of the strip 16 to prevent longitudinal displacement of said strip relative to said channel when the lining 17 is brought into braking relation with the drum adapted to be engaged thereby. During the braking operation the strip 16 is firmly pressed into its channel seat and held in fixed relation with the band 10, and when the brake is released, the tension of said strip holds it in position within said band and the flanges 14 prevent lateral displacement of the lining relative to said band. When the lining 17 has become worn or requires replacement, the strip 16 is removed from its channel seat, a hole 18 being provided in the band 10 for the insertion of a punch or other tool to facilitate the unseating of said strip, and a strip carrying a new length of material 17 is substituted, thus permitting of facile relining of the brake without costly expenditure of time and labor.

In the modification according to Figures 4, 5, 6 and 7, the flanges 14 and lugs 15 are dispensed with and the band 10 is formed with radially-opening, longitudinal slots adjacent its free ends. The strip 16 carrying the lining 17 as above described is formed with radially-extending ears 19 and 20 longitudinally disposed on its outer surface in position to register with and be received through the slots in the band 10 when said strip is positioned within said band, the ear 19 being formed with a circumferentially-extending, hooked end adapted to engage over the band 10 beyond its respective slot and lock one end of said strip to said band and the ear 20 is of a length no greater than its respective slot and is formed with an undercut adjacent one end opening toward the interruption of the band 10 to receive the free end of a leaf spring 21 fixed at its other end to the band 10, thus locking the ear 20 against radial displacement inwardly of the band 10 and permitting a limited longitudinal movement of one end of the strip 16 relative to said band.

To prevent lateral displacement of the mid-portion of the strip 16 relative to the band 10, a length of pliable metal 22 is fixed transversely of and projects at each end beyond the strip 16 intermediate the ends of said strip, the projecting portions of the length 22 being adapted to be bent about and clamped against the margins of the band 10, as is shown in dotted lines in Figure 7. Thus, by unclamping the ends of the portion 22 from the band 10 and disengaging the spring 21 from the ear 20, the ears 19 and 20 may be easily withdrawn through their respective slots and the strip 16 and lining 17 removed from the band 10, a substitute strip 16 carrying a new lining 17 being readily inserted in said band by a reversal of the above steps.

In the modification according to Figures 8, 9, 10 and 11, the band 10 is the plain, conventional brake band commonly found on motor vehicles and the strip 16 carrying its lining 17 is secured in position within said band by a plurality of clamp members, each of said members comprising counterpart portions 23 formed with hooked ends 24 adapted to engage and embrace adjacent margins of the band 10 and strip 16, said portions 23 having apertured ears 25 on their other ends arranged in opposition centrally of the outer surface of the band to receive bolts 26 whereby the portions 23 of each clamp member may be locked together to bring the hooked ends 24 of said portions into close engagement with the margins of the band 10 and strip 16, thus securely holding said strip in the desired relation with said band, it being obvious that when the bolts 26 are loosened the clamp members may be removed from the band 10, the strip 16 and lining 17 then being readily removable from said band for replacement by a new assembly of strip and lining.

In the modification according to Figure 12, the band 10 is formed with an annular groove or channel 27 along one margin adapted to receive and position one edge of the strip 16, and a separate annular channel 28 is mounted in embracing relation with the adjacent plain edges of the strip 16 and band 10, apertured ears 29 being secured at spaced intervals to the channel 28 in opposed, registering relation with similar ears 30 secured to the band 10 to receive bolts 31 engaging through each pair of ears 29 and 30 whereby the said ears may be locked together and the channel 28 drawn into close relation with the embraced edges of the strip and band, thus clamping said strip to said band to prevent movement therebetween and permitting of facile removal and replacement of the strip 16 and lining 17 through loosening of the bolts 31 and removal of the channel 28.

As above stated, the illustrative showing of the invention is only indicative and portrays but one of many possible applications of the invention, the alterations necessary to adapt the invention to expansible vehicle brakes and to other brake installations of the friction type being obvious to anyone skilled in the art, hence I wish to be understood as being limited solely by the scope of the appended claims rather than by the illustrative showing and foregoing description.

I claim as my invention—

1. In a brake assembly, a brake band in the form of an interrupted circle, a flexible spring metal strip loosely mounted against the inner surface of said band, a friction lining secured to the inner surface of said strip and means carried by said band to position and hold said strip thereon, said means comprising annular, marginal flanges on said band having a depth equal to the thickness of said strip and engaging against sides of said strip to limit lateral movement thereof and extensions of said flanges extending transversely of the ends of said band to engage against ends of said strip and limit circumferential movement thereof within said band, said strip being held in the channel defined by said flanges solely by its inherent tension.

2. In a brake assembly having a brake band and a friction lining, means for mounting said lining for ready removal and replacement relative to said band, said means comprising a shallow, ungrooved, annular channel on the inner surface of said band substantially closed at each end of said band and a flexible spring metal strip secured to said lining, said strip being adapted to fit snugly within and substantially fill said channel, whereby said lining is positioned and held relative to said band solely by the inherent tension of said strip engaged in said channel.

Signed at Denver, in the county of Denver and State of Colorado, this 26th day of April, 1929.

EDWARD J. McCUNE.